Feb. 4, 1958 E. L. RICHARDSON 2,822,057
ELECTROSTATIC PRECIPITATORS
Filed June 27, 1955 4 Sheets-Sheet 1

Inventor:
Earl L. Richardson,
by Robert T. Palmer
Attorney

Feb. 4, 1958 — E. L. RICHARDSON — 2,822,057
ELECTROSTATIC PRECIPITATORS
Filed June 27, 1955 — 4 Sheets-Sheet 2

Inventor:
Earl L. Richardson,
by Robert T. Palmer
Attorney

Feb. 4, 1958 E. L. RICHARDSON 2,822,057
ELECTROSTATIC PRECIPITATORS
Filed June 27, 1955 4 Sheets-Sheet 3

Inventor:
Earl L. Richardson,
by Robert T. Palmer
Attorney

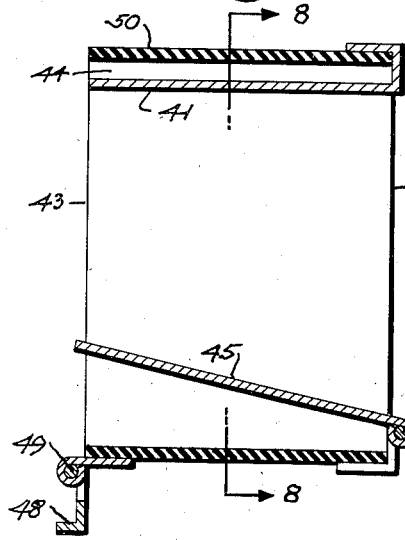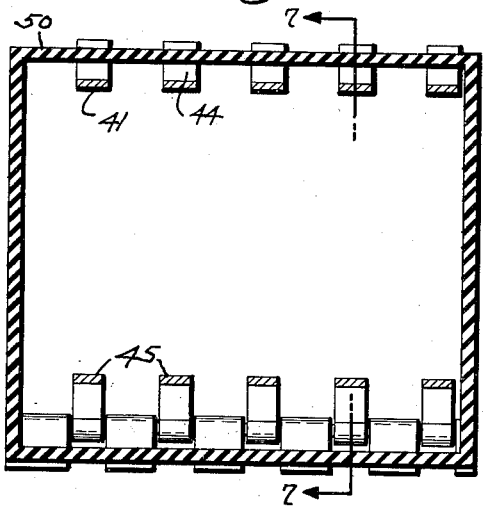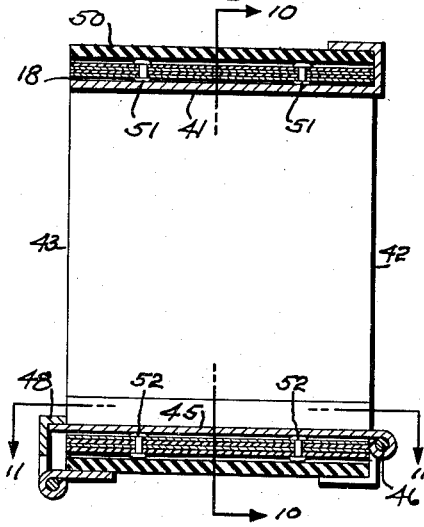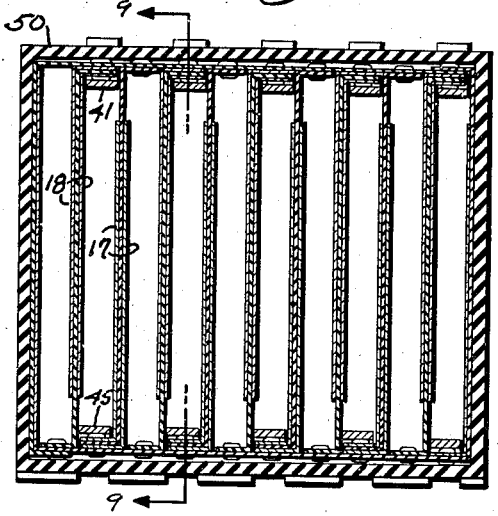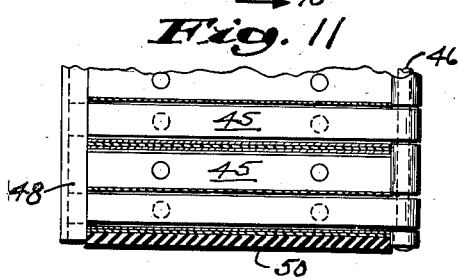

United States Patent Office 2,822,057
Patented Feb. 4, 1958

2,822,057

ELECTROSTATIC PRECIPITATORS

Earl L. Richardson, Hyde Park, Mass., assignor to Westinghouse Electric Corporation, East Pittsburgh, Pa., a corporation of Pennsylvania Application June 27, 1955, Serial No. 518,077

2 Claims. (Cl. 183—7)

This invention relates to electrostatic precipitators having disposable collector cells of flexible sheet-like material, and has as an object to stiffen such cells when they are placed in operating position, for maintaining alignment of their collector surfaces.

My U. S. Patent No. 2,604,183 discloses a collector cell having thin sheet-like walls which can be collapsed for storage and shipment. When such a cell is placed within the casing or duct of a precipitator, the thin flexible walls tend to sag or lean so that improper alignment and spacing of the collector surfaces may result. This invention provides means for stretching the walls of such a cell when the cell is in operating position whereby the walls are maintained under tension with their associated collection surfaces properly spaced and in alignment.

This invention will now be described with reference to the annexed drawings, of which:

Fig. 7 is a side section along the line 7—7 of Fig. 8, of another embodiment of this invention, the collector cell being omitted, and the cell stretcher being in nonstretching position;

Fig. 8 is a front section along the line 8—8 of Fig. 7;

Fig. 9 is a side section similar to Fig. 7 but with a collector cell in position, and a cell stretcher in stretching position, the section being along the line 9—9 of Fig. 10;

Fig. 10 is a section along the line 10—10 of Fig. 9, and Fig. 11 is a fragmentary section along the line 11—11 of Fig. 9.

Figure 1:
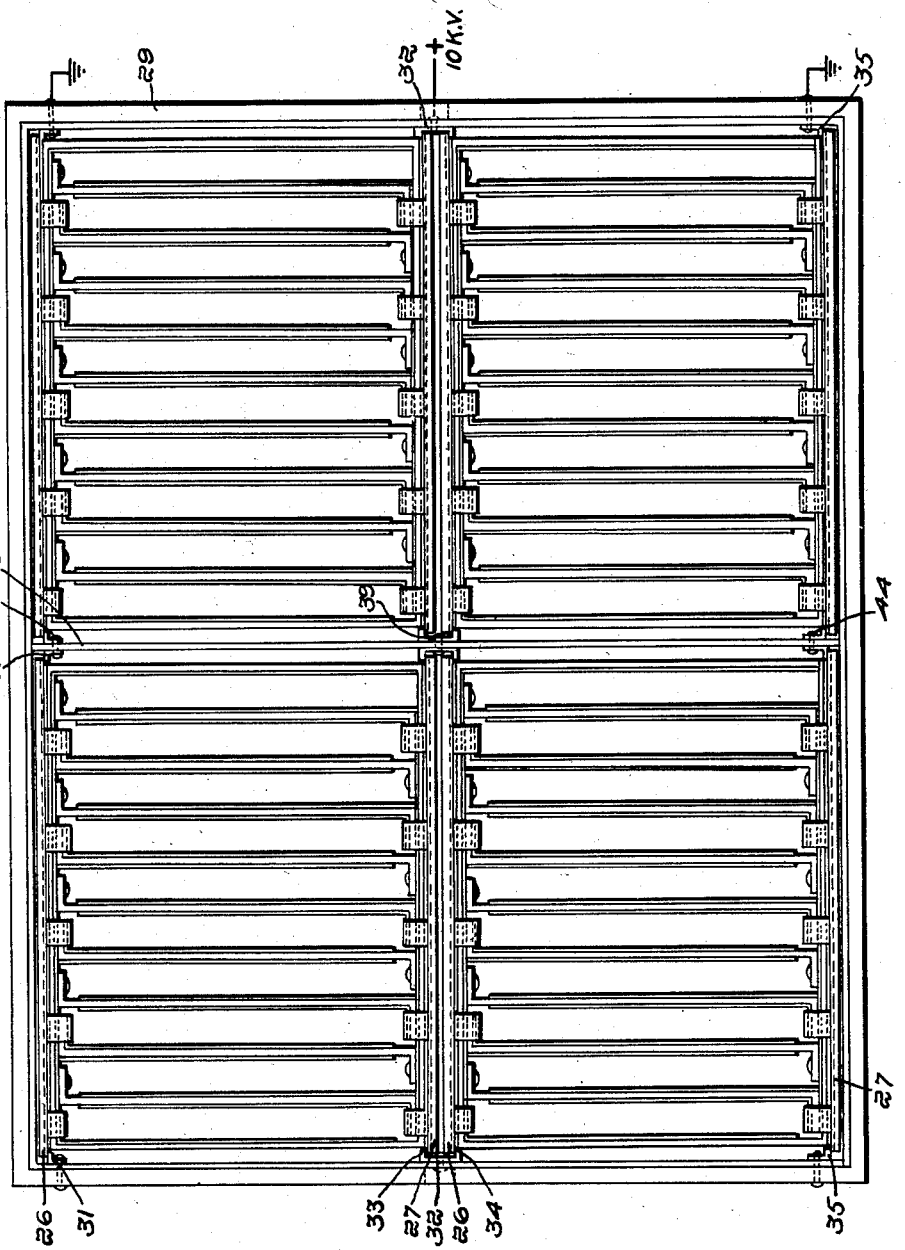
Fig. 1 is a front elevation of an electrostatic precipitator containing four collector cells embodying this invention.
Figure 2:
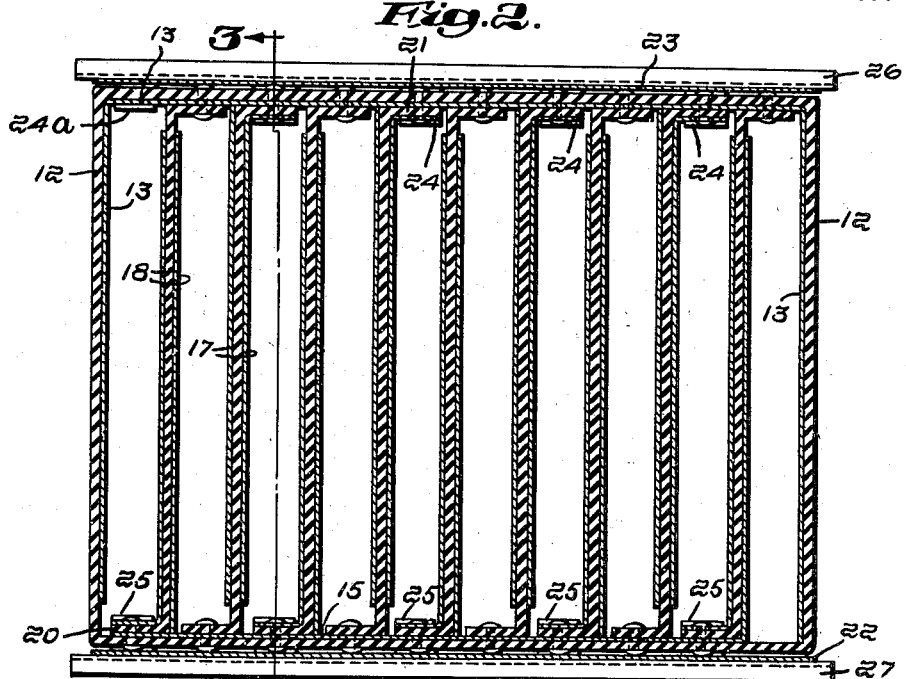
Fig. 2 is an enlarged front section of one of the cells of Fig. 1, the section being along the line 2—2 of Fig. 3.
Figure 3:
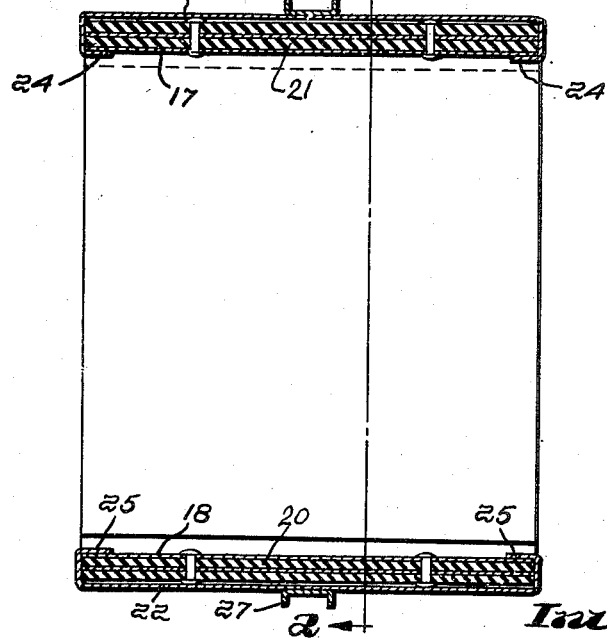
Fig. 3 is a section along the line 3—3 of Fig. 2.
Figure 4:
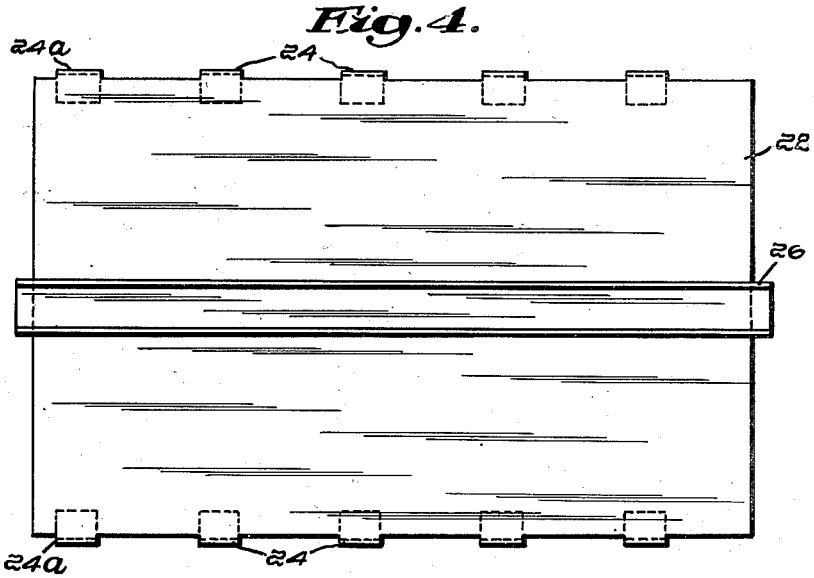
Fig. 4 is a plan view of one of the cell stretching plates used in Figs. 1–3.
Figure 5:
Fig. 5 is a side elevation of the plate of Fig. 4.
Figure 6:
Fig. 6 is an end view of the plate of Figs. 4 and 5.

The collector cells shown by the drawings are generally similar to the one disclosed in my said patent, and are constructed of electric insulating material such as thick paper, cardboard and the like, with metal foils cemented thereto or coated thereon.

Referring first to Figs. 1–6, each cell has an outer wall 12 forming the top, bottom and sides of the cell. A metal foil 13 is affixed to the inner surface of the outer wall except at its bottom and near the bottom of its left side (facing Fig. 2). A similar foil 15 extends along the inner surface of the bottom of the cell but is omitted near the right and left sides of the cell. The foil 13 where it extends along the inner surfaces of the left and right sides of the cell forms its outer collector plate surfaces. The other plate surfaces having the same polarity as the foil 13 are formed by foils 17 which are affixed to alternate vertically extending inner cell walls, the foils 17 being electrically connected to the foil 13. The collector plate surfaces having the opposite polarity are formed by foils 18 affixed to the other vertically extending inner cell walls, and which are electrically connected to the foil 15.

The cell walls having the foils 18 thereon have turned-over horizontally extending stub portions 20 at the bottom of the cell with foils 18 on their upper surfaces. The cell walls having the foils 17 thereon have turned-over stub portions 21 at the top of the cell with foils 17 on their lower surfaces.

For preventing the flexible walls of such a cell from bending when the cell is placed in operating position, upper and lower metal stretching plates 22 and 23 respectively, are provided. The plate 22 has spaced-apart spring fingers 24 along its sides which have cell-contacting portions below the plate and extending inwardly of its sides in contact with the foil 17 on the bottoms of the stub portions 21 at the front and back of the cell. A pair of similar fingers 24A contact the bottom side of the foil 13 on the under surface of the top of the cell at its left side.

The plate 23 has spaced-apart spring fingers 25 along its sides which have cell contacting portions above the plate and extending inwardly of its sides in contact with the foils 18 on the tops of the stub portions 20 at the front and back of the cell.

The cell stretching plates 22 and 23 have channels 26 and 27 respectively, which extend across their top and bottom respectively, beyond the ends of the plates.

Referring now to Fig. 1 of the drawings, a rectangular casing 29 having four cell compartments, is constructed of electrical insulating material such as Bakelite, Formica or other suitable material, and has a central vertically extending inner wall 30 of the same material. Attached to the inner surfaces of the right and left sides of the casings, and to the opposite sides of the central wall 30 adjacent the top of the casing are aligned, horizontally extending metal shelves 31 over which are placed the ends of the channels 26 of the upper cell stretching plates 22 of the two upper cells. Attached to the inner surfaces of the right and left sides of the casing and to the opposite sides of the central wall 30 at their centers are metal brackets 32, the upper portions of which form aligned horizontally extending shelves 33 under which the ends of the channels 27 of the lower cell stretching plates 23 of the two upper cells are placed.

The brackets 32 also form aligned horizontal shelves 34 just below the shelves 33 and which support the ends of the channels 26 of the upper cell stretching plates 22 of the two lower cells.

Attached to the inner surfaces of the right and left sides of the casing and to the opposite sides of the central wall 30 adjacent the bottom of the casing are the aligned metal shelves 35 under which are placed the ends of the channels 27 of the lower stretching plates 23 of the two lower cells.

To place the channels of the upper and lower stretching plates of a cell in contact with their associated shelves requires the stretching of the spring fingers which support the upper and lower walls of the cell. Thus, the upper and lower walls of the cell are tensioned upwardly and downwardly respectively, moving slightly apart sufficiently to stretch the vertically extending inner walls to which the foils forming the collector plate surfaces are attached. The collector plate surfaces are thus maintained in parallel relation.

The brackets 32 attached to opposite sides of the central wall 30 are electrically connected by a rivet 39 extending through the wall. The shelves 31 attached to opposite sides of the central wall 30 are electrically connected by a rivet 40. The shelves 35 attached to opposite sides of the wall 30 are electrically connected by a rivet 44. With the cells in operating position, corresponding horizontally aligned brackets and shelves are electrically connected by the channels of the stretching plates and the rivets.

An outer bracket 32 can be connected to the positive terminal, say the +10 kv. terminal of the power pack, and through the brackets, the rivets connecting the intermediate bracket, and the associated channels, will connect the foils 18 of the upper cells and the foils 17 of the lower cells to the same positive terminal. Outer shelves 31 and 35 at one side of the casing, say the right side, can be connected to the negative terminal of the power pack and to ground, and through the shelves, the rivets connecting corresponding intermediate shelves, and the associated channels, will connect the foils 17 of the upper cells and the foils 18 of the lower cells to ground. Thus, the foils 18 of the two upper cells will form the charged plate surfaces of the upper cells with the foils 17 of the upper cells forming the grounded plate surfaces, and the foils 17 of the two lower cells will form the charged plate surfaces of the lower cells with the foils 18 forming their grounded plate surfaces.

Figs. 7-11 of the drawings illustrate another embodiment of this invention in which each collector cell has its own insulating casing 50. Spaced-apart metal straps 41 extend from the air outlet side 42 of the casing where they have bent-over portions contacting the top of the casing, to the air inlet side 43 of the casing, open spaces 44 being formed between the straps and the top of the casing. A corresponding number of straps 45 are pivoted at 46 at the bottom of the air outlet side of the casing, and their front ends are adapted to be engaged by the latches 48 which are pivoted at 49 at the bottom of the air inlet side of the casing, when the front ends of the straps 45 are pulled downwardly as shown by Fig. 9.

Figs. 7 and 8 show an empty casing with the straps in cell receiving position. A cell is slid into the casing through its air inlet end, the top of the cell passing into the spaces 44, and the bottom of the cell passing into the spaces between the straps 45 and the bottom of the casing. With the cell in position, the front ends of the straps 45 are swung downwardly and engaged by the latches 48 as shown by Figs. 9 and 10. The straps 41 contact rivets 51 which extend through foils 18 and upper turned-over stubs of alternate, intermediate vertically extending walls, and the straps 45 contact rivets 52 which extend through foils 17 and lower turned-over stubs of the other intermediate, vertically extending cell walls. The pull on the cell walls by the straps 41 and 45 stretch the vertically extending cell walls to which the foils are attached, causing their collector plate surfaces to be maintained in proper parallel relation.

The straps 41 can be connected to a terminal of one polarity of a suitable power pack, and the straps 45 can be connected to a terminal of the opposite polarity for charging the foils 17 and 18 oppositely as in the case of Figs. 1-6.

While embodiments of the invention have been described for the purpose of illustration, the invention is not limited to the exact apparatus and arrangement of apparatus illustrated since modifications thereof may be suggested by those skilled in the art without departure from the essence of the invention.

What is claimed is:

1. An electrostatic precipitator comprising a casing, a collector cell in said casing, said cell having a pair of oppositely positioned walls with a plurality of spaced apart flexible electrode supporting sheets extending therebetween, said sheets having conductive surfaces forming collector electrodes, a pair of plates, one plate extending across the outer surface of one of said walls and the other plate extending across the outer surface of the other of said walls, a plurality of fingers formed on said plates at the interior surfaces of each of said walls between said sheets, the fingers on one of said plates being of spring metal, shelf means in said casing, one of said plates being supported by said shelf means, other shelf means in said casing, said other plate being supported by said other shelf means, said plates being moved apart in being supported by said shelf means and causing said fingers to move said walls apart so as to stretch said sheets.

2. An electrostatic precipitator as claimed in claim 1 in which the fingers on the other of said plates are of spring metal.

References Cited in the file of this patent

UNITED STATES PATENTS

| | | |
|---|---|---|
| 930,561 | Rahe | Aug. 10, 1909 |
| 1,049,789 | Williamson | Jan. 7, 1913 |
| 2,604,183 | Richardson | July 22, 1952 |